US008462782B2

(12) United States Patent
Diab et al.

(10) Patent No.: US 8,462,782 B2
(45) Date of Patent: Jun. 11, 2013

(54) SYSTEM AND METHOD FOR USING SEQUENCE ORDERED SETS FOR ENERGY EFFICIENT ETHERNET COMMUNICATION (75) Inventors: Wael William Diab, San Francisco, CA (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 431 days.

(21) Appl. No.: 12/165,595

(22) Filed: Jun. 30, 2008

(65) Prior Publication Data

US 2009/0185565 A1   Jul. 23, 2009

Related U.S. Application Data (60) Provisional application No. 61/022,448, filed on Jan. 21, 2008.

(51) Int. Cl.
*H04L 12/28* (2006.01)

(52) U.S. Cl.
USPC ............................. 370/391; 370/252; 370/445

(58) Field of Classification Search
USPC .............. 370/460, 469, 474, 450, 468, 395.4, 370/402, 229
See application file for complete search history.

(56) References Cited

U.S. PATENT DOCUMENTS

| 6,388,997 | B1 * | 5/2002 | Scott | 370/280 |
|---|---|---|---|---|
| 7,382,805 | B1 * | 6/2008 | Raza et al. | 370/528 |
| 7,461,195 | B1 * | 12/2008 | Woodral | 710/313 |
| 7,664,134 | B2 * | 2/2010 | Caldwell et al. | 370/459 |
| 7,720,068 | B2 * | 5/2010 | McClellan | 370/391 |
| 2004/0202198 | A1 * | 10/2004 | Walker et al. | 370/474 |
| 2005/0063413 | A1 * | 3/2005 | Caldwell et al. | 370/450 |
| 2008/0049788 | A1 * | 2/2008 | McClellan | 370/468 |
| 2008/0107136 | A1 * | 5/2008 | Joo et al. | 370/503 |
| 2008/0181212 | A1 * | 7/2008 | Curcio et al. | 370/389 |
| 2009/0154492 | A1 * | 6/2009 | Diab et al. | 370/465 |
| 2009/0204736 | A1 * | 8/2009 | Xie et al. | 710/104 |

OTHER PUBLICATIONS

IEEE 802.3ae-2002, Section 48, Physical Coding Sublayer (PCS) and Physical Medium Attachment (PMA) sublayer, type 10GBASE-X, 2002.

* cited by examiner

*Primary Examiner* — Michael J Moore, Jr.
(74) *Attorney, Agent, or Firm* — Duane S. Kobayashi (57) ABSTRACT

A system and method for using sequence ordered sets for energy efficient Ethernet communication. Sequence ordered sets can be generated by a first device for communication of parameter(s) to a second device, which parameters can be used in implementing an energy efficient Ethernet control policy. Sequence ordered sets can be used in communication between physical layer devices, or between a physical layer device and a media access control device. In one example, the sequence ordered set can identify a point at which a rate transition is to occur.

18 Claims, 7 Drawing Sheets

SYSTEM AND METHOD FOR USING SEQUENCE ORDERED SETS FOR ENERGY EFFICIENT ETHERNET COMMUNICATION

This application claims priority to provisional application No. 61/022,448, filed Jan. 21, 2008, which is incorporated by reference herein, in its entirety, for all purposes.

BACKGROUND

1. Field of the Invention

The present invention relates generally Ethernet systems and, more particularly, to a system and method for using sequence ordered sets for energy efficient Ethernet communication.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

Most network links are typically in an idle state between sporadic bursts of data. In this scenario, the overall link utilization can therefore be relatively low. In other network links, there can be regular or intermittent low bandwidth traffic, with bursts of high bandwidth traffic. In general, reducing link rates when the high data capacity is not needed can save energy. In other words, a link can use a high data rate when data transmission needs are high, and use a low data rate when data transmission needs are low. In designing an energy efficient solution, however, an additional consideration is the extent to which the traffic is sensitive to buffering and latency. For example, some traffic patterns (e.g., HPC cluster or high-end 24-hr data center) are very sensitive to latency such that buffering would be problematic. For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application. One of the significant energy factors is the energy that it takes to get in and out of those states (PHY and above). What is needed therefore is an efficient mechanism for exchanging energy efficient information that can be used in implementing an optimal solution.

SUMMARY

A system and/or method for using sequence ordered sets for energy efficient Ethernet communication, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts, including backplane, twisted pair, and optical applications. Each of these different contexts can benefit from the application of energy efficient concepts that seek to adapt the link, link rate, and layers above the link to an optimal solution.

In the description below, the principles of the present invention are described with reference to an example backplane Ethernet application. This example is simply for illustration purposes and is not intended to be limiting on the scope of the present invention. As will become apparent from the following description, the principles of the present invention can be applied to various applications as well as standard, non-standard, and future link rates.

Figure 1:
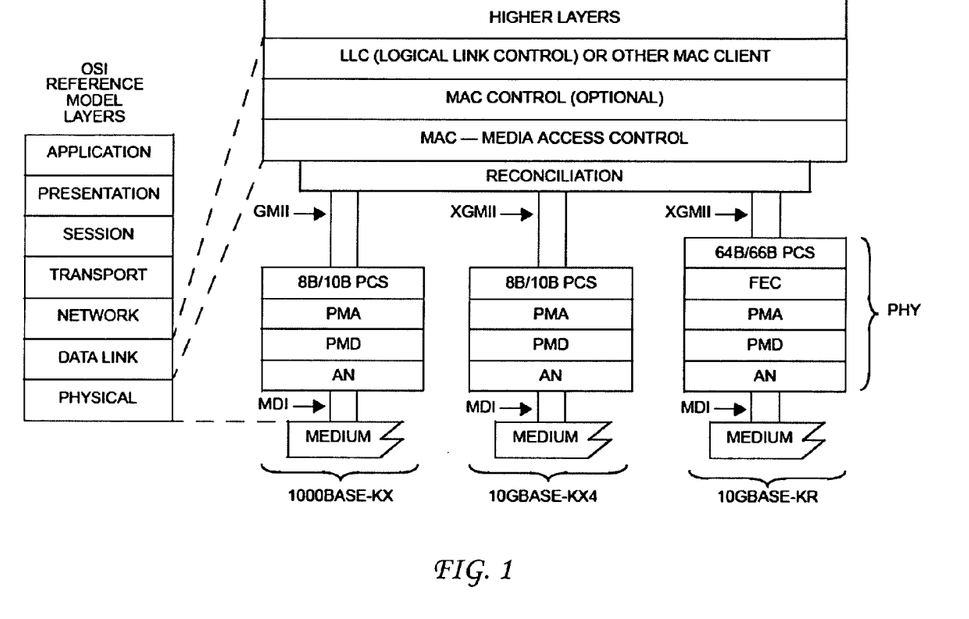
FIG. 1 illustrates an example of Ethernet physical layer devices (PHYs).

In general, backplane Ethernet couples the IEEE 802.3 (CSMA/CD) MAC to a family of Physical Layers defined for operation over electrical backplanes. FIG. 1 illustrates the relationships among Backplane Ethernet, the IEEE 802.3 MAC, and the ISO Open System Interconnection (OSI) reference model. As illustrated, three different physical layer devices (PHYs) are specified: 1000 BASE-KX specifies 1 Gbit/s serial operation, 10 GBASE-KX4 specifies 10 Gbit/s 4-lane operation, and 10 GBASE-KR specifies 10 Gbit/s serial operation.

As illustrated, the 1000 BASE-KX core includes a physical coding sublayer (PCS), a physical medium attachment (PMA), physical media dependent (PMD), and auto-negotiation (AN). The PCS is generally responsible for encoding/decoding gigabit media independent interface (GMII) octets to/from ten-bit code-groups (8 B/10 B) for communication with the underlying PMA. In contrast, the PCS in the 10 GBASE-KR core is generally responsible for encoding/decoding 10 gigabit media independent interface (XGMII) 64-bit data to/from 66-bit code-groups (64 B/66 B) for communication with the underlying PMA.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying serial PMD, recovery of clock from the coded data (e.g., 8 B/10 B, 64 B/66 B, etc.)

supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

As noted above, the PMA is responsible for the recovery of the received clock, which is used by the PCS to sample the data presented to it by the PMA. Conventional clock recovery mechanisms use delay locked loops (DLLs) or phase locked loops (PLLs) that align a local clock's phase to the phase of the recovered clock.

In general, the lack of data transmission does not significantly reduce energy consumption of a PHY in most implementations. A 10 Gbit/s link, for example, will consume about the same amount of power whether a burst of data is transmitted during a file transfer, a constant stream of data is transmitted at lower bandwidth, or no data is transmitted during an idle period. If a 10 Gbit/s link can be slowed down to a 1 Gbit/s link during idle times, then power can be saved in the operation of the PHY. Moreover, if the PHY is clocked at a lower rate, then the higher layer elements (e.g., MAC layer) that interface with the PHY could also potentially be clocked at a lower rate. If multiple ports slow down, then shared resources (e.g., switch, memory interfaces, etc.) could also be slowed down as well. In the aggregate, significant power savings can be achieved through the operation of the link at lower rates.

One of the key considerations in efficient link utilization is the speed at which the transitions between link rates can occur. This is especially true in the transition from a reduced link rate to the maximum supported link rate, as unscheduled bursts of data arrive for transport. In one implementation, the link status as reported to the higher layers remains unchanged even if the link rate is reduced. Accordingly, the higher layers would continue to presume that the PHY is operating at full capacity. In this context, the transition time (e.g., millisecond v. microsecond levels) between link rates can therefore have a large memory impact when considering the amount of buffering that would be needed to facilitate large bursts of incoming data.

In the example 802.3ap implementation, transitions between a 10 Gbit/s link and a 1 Gbit/s link can be effected by transitioning between a 10 GBASE-KR link and a 1000 BASE-KX link. In this process, the PHY would, in effect, be transitioning between two distinct state machines that implement the 10 GBASE-KR and 1000 BASE-KX cores. As part of this process, the state of a first core would need to be saved prior to the switch, whereupon new transceiver coefficients would be acquired upon training and initialization of the second core. This process of saving state and reacquiring new operating coefficients can lead to unacceptably long link transition times (e.g., milliseconds). There is also possibility that the stored state may "drift" over time causing either (a) longer time for convergence to occur, or (b) re-training since the coefficients would be stale.

Faster transition times between two link rates (e.g., 10 Gbit/s to 1 Gbit/s, 5 Gbit/s to 100 Mbit/s, etc.) can be enabled through the creation of a lower-rate PHY that is a subset of a higher-rate PHY. In one embodiment, the line code for the lower data rate is a simple subset of the higher data rate. This enables the subset PHY to be implemented by simply turning off elements of the higher data rate standard parent PHY.

Figure 2A:
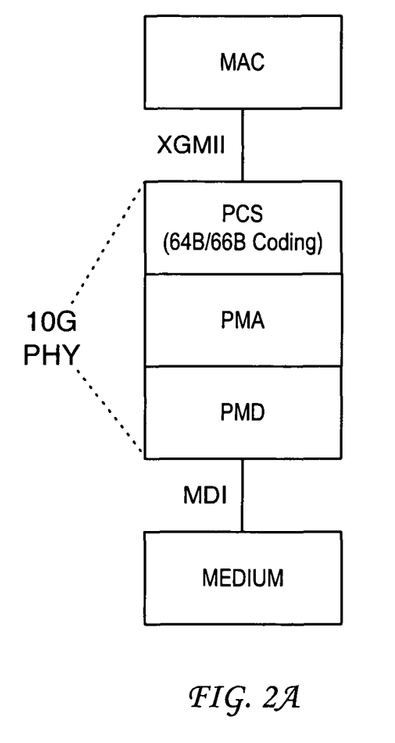
FIGS. 2A and 2B illustrate an example of parent and subset PHYs.

Consider for example the 10 GBASE-KR PHY. FIG. 2A illustrates a simplified diagram of the 10 GBASE-KR core.

As illustrated, the PCS of the 10 G PHY is responsible for encoding/decoding XGMII 64-bit data to/from 66-bit code-groups (64 B/66 B) for communication with the underlying PMA. This 64 B/66 B line code is used to achieve DC-balance and operates with considerably less overhead (10.3125 Gbaud) as compared to the 8 B/10 B line coding (1.25 Gbaud) used by the 1000 BASE-KX core. Due to the difference in coding schemes the 10 GBASE-KR and 1000 BASE-KX cores do not have a fundamental frequency relationship between them.

Figure 3:
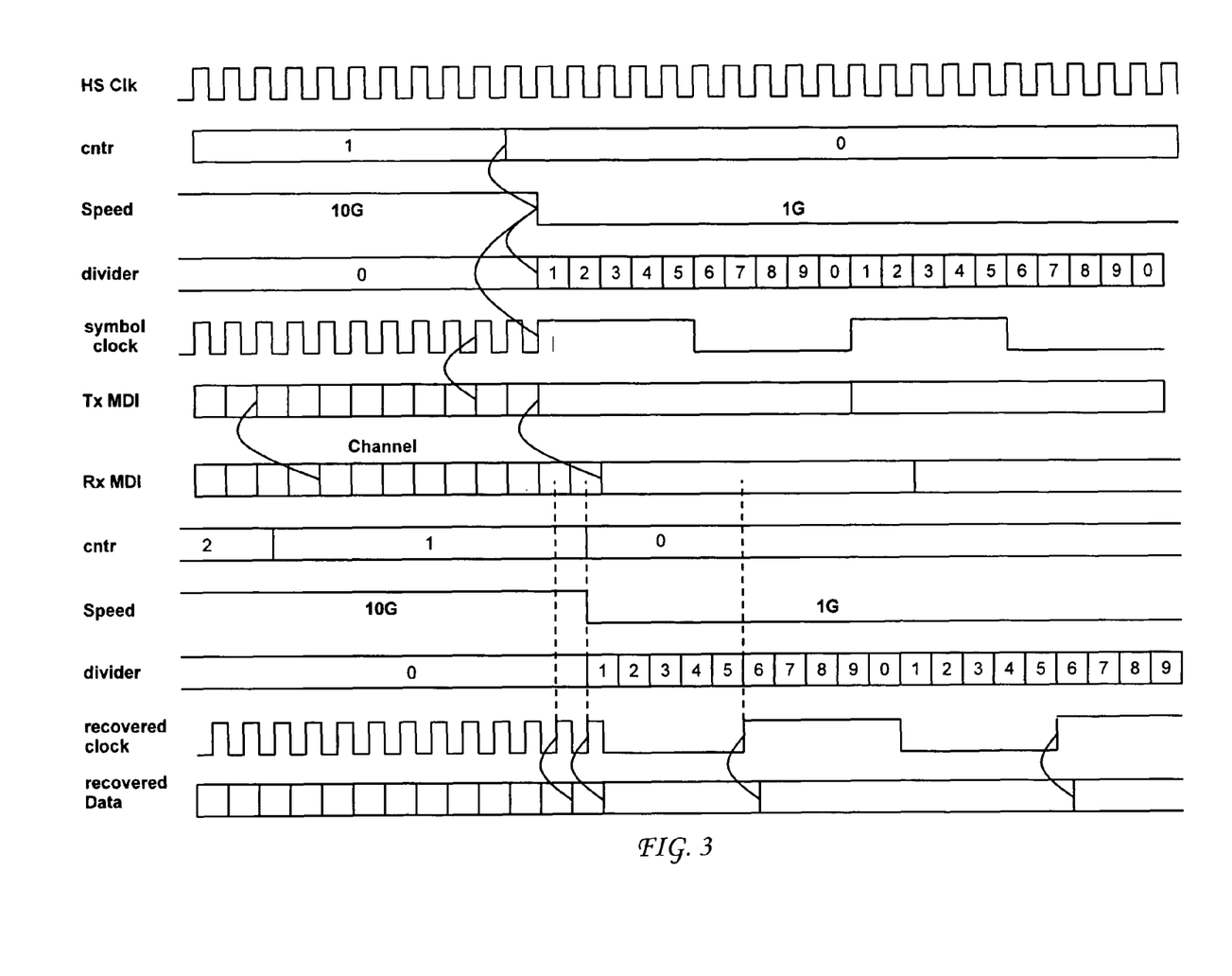
FIGS. 3 and 4 illustrate an example of synchronously shifting between subset and parent PHYs.
Figure 4:
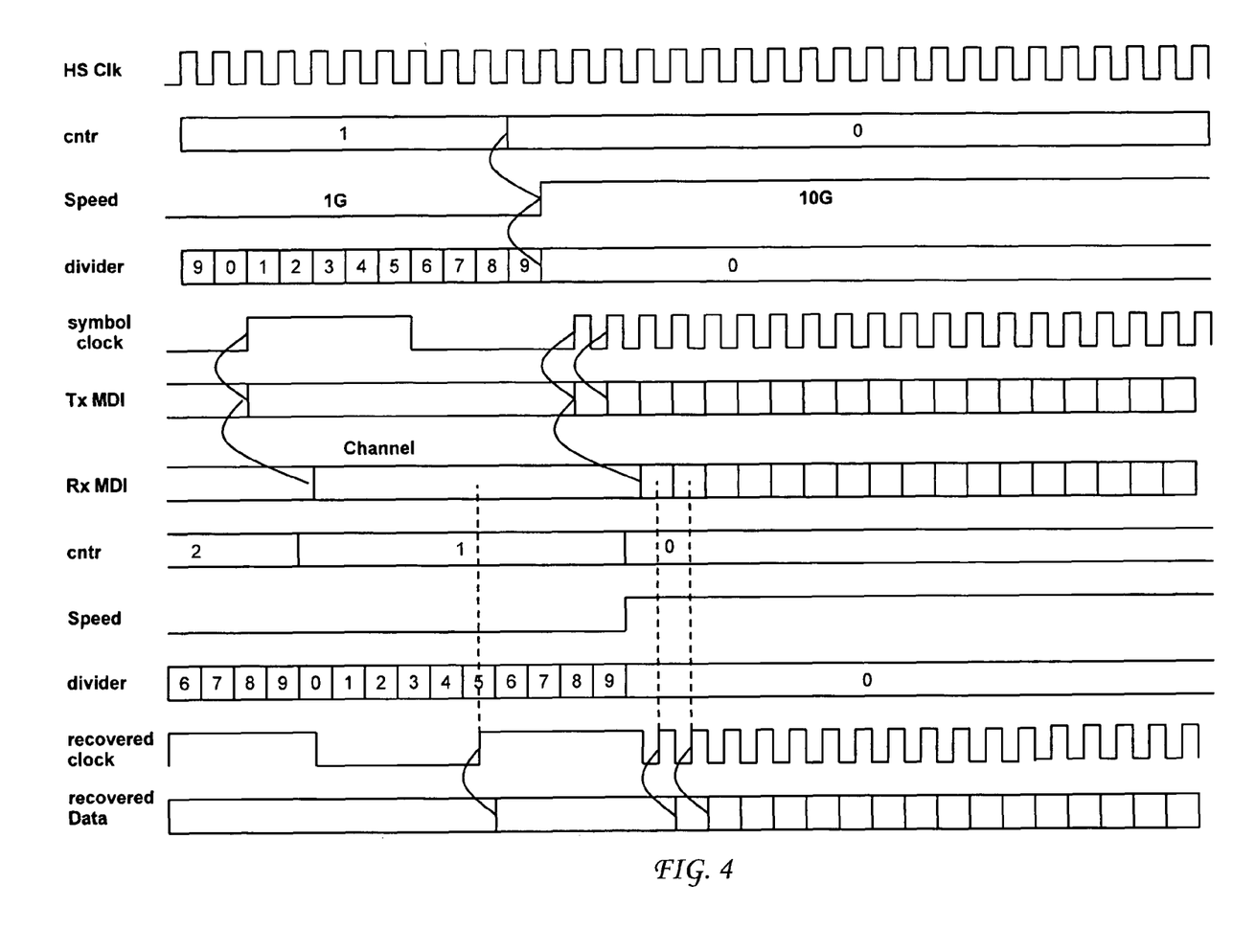

A subset PHY can be produced that is fundamentally related to a parent PHY. This fundamental relationship (e.g., divide by 10) enables the subset and parent PHYs to have a synchronous relation in retaining the relative bit boundaries. FIGS. 3 and 4 illustrate an example of shifting between subset and parent PHYs that have a fundamental relationship. Significantly, the synchronous relation between the subset and parent PHYs enable seamless transitions between the subset and parent PHYs on the fly.

In one embodiment, the parent PHY is an enhanced core (e.g., 10 GBASE-KR) that can be slowed down and sped up by whatever frequency multiple. For example, the enhanced core can be slowed down by a factor of 10 during low link utilization, then sped up by a factor of 10 when a burst of data is received. In the example of a factor of 10, a 10 G enhanced core can be transitioned down to a 1 G link rate when idle, and sped back up to a 10 G link rate when data is to be transmitted.

In one embodiment, the enhanced core includes control logic that would enable a timing element (e.g., DLL or PLL) that drives the enhanced core to be divided/multiplied in frequency when a link utilization state transition is detected. A transition from a high utilization state to a low utilization state would cause the control logic to divide the frequency of the timing element, while a transition from a low utilization state to a high utilization state would cause the control logic to multiply the frequency of the timing element.

Figure 2B:
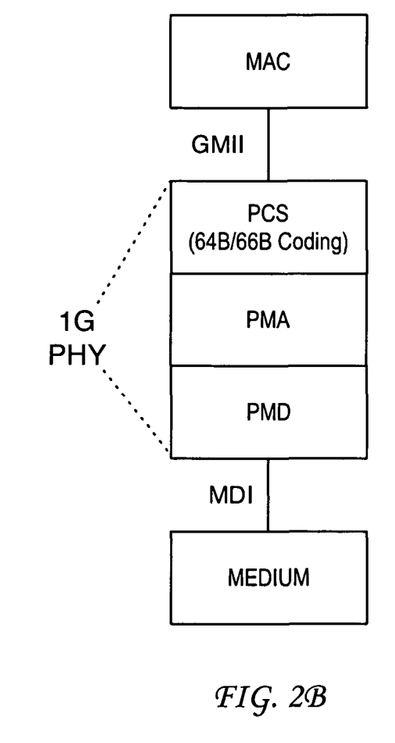

The subset PHY can therefore be viewed as a down-clocked version of the parent PHY, with certain elements of the parent PHY being turned off (e.g., forward error correction, parallel circuits, etc.) or turned down (e.g., analog biases) by the control logic. FIG. 2B illustrates a simplified view of a subset PHY that is based on the 10 G parent PHY of FIG. 2A. As illustrated, the 1 G subset PHY has retained the 64 B/66 B coding by the PCS. Instead of operating at 10.3125 Gbaud, however, the 1 G subset PHY operates at 1.03125 Gbaud, or one tenth of the rate of the parent 10 G PHY. The implementation of a down clocked 64 B/66 B coding in the 1 G subset PHY is in contrast to conventional 1 G PHYs that operate with 8 B/10 B coding.

With the use of subset PHYs, link rates can be synchronously changed up or down. In this process, the 64 B/66 B encoder/decoder would get a continuous clock so that it does not lose synchronization. The complexity of switching between different cores is thereby eliminated, leading to faster switching times on the order of tens of microseconds. In general, no changes to the wire signaling would be needed due to the simple and limited control overhead.

As would be appreciated, the switching in link rates would require coordination on both ends of the link. This coordination between both ends of the link can be facilitated by some form of communication regarding the need for a transition up or down in speed. In one conventional communication mechanism, this communication is based on request and acknowledge packets that are transmitted between the two ends of the link. In this process, the total delay in implementing a rate change on the link is impacted by the link latency in a round trip message cycle, the packet processing times on both ends, and the link restart times.

In accordance with the present invention, this delay can be reduced through a control communication mechanism that is implemented in the physical layer. In general, a physical layer control mechanism is quicker and has greater coordination resolution as compared to that provided by higher layer packet protocols. Higher layer packet protocols rely on timing through the MAC and above and can vary from implementation to implementation and box to box.

It is a feature of the present invention that sequence ordered sets can be used to communicate control information in switching link rates. In general, sequence or ||Q|| ordered sets can be used to extend the ability to send control and status information over the link. Sequence ordered sets consist of a control character (/Q/) followed by three data characters. Sequence ordered sets indicate to the PCS that a link status message has been initiated. The PCS receive process may also initiate sequence ordered sets upon detection of a link status message.

In the present invention, it is recognized that ||Q|| ordered sets provide an advantageous mechanism to communicate via the physical layer, and can be used during interpacket gaps (IPG). Further, ||Q|| ordered sets allows the reuse of existing control mechanisms and logic that are already present in some Ethernet devices. For example, ||Q|| ordered sets have already been defined for 10 GBASE-KR.

In one embodiment, quick transitions between link rates is facilitated by ||Q|| ordered sets that precisely identify points at which a transition between link rates would occur. In the description above, subset and parent PHYs were described that enabled synchronous transitions between link rates. These transitions can occur within the data stream and need not be limited to packet boundaries. In one example, ||Q|| ordered sets can be provided as follows:

$$||Q_{dn}||=/Q/D0.0/D=\text{down}/n/$$

$$||Q_{up}||=/Q/D=\text{up}/D0.0/n/,$$

where n is equal to a number greater than two. In this example, $||Q_{dn}||$ would specify "n", which is the number of bytes after the receipt of $||Q_{dn}||$ at which a lower link rate would commence. Similarly, $||Q_{up}||$ would specify "n", which is the number of bytes after the receipt of $||Q_{up}||$ at which a higher link rate would commence.

With the use of these ||Q|| ordered sets, a physical layer communication mechanism is used that can quickly and precisely identify points of transition between link rates. The overhead in such a communication process is also minor. This is in contrast to the time-consuming request/acknowledge packet sequence used by higher layers.

Figure 5:
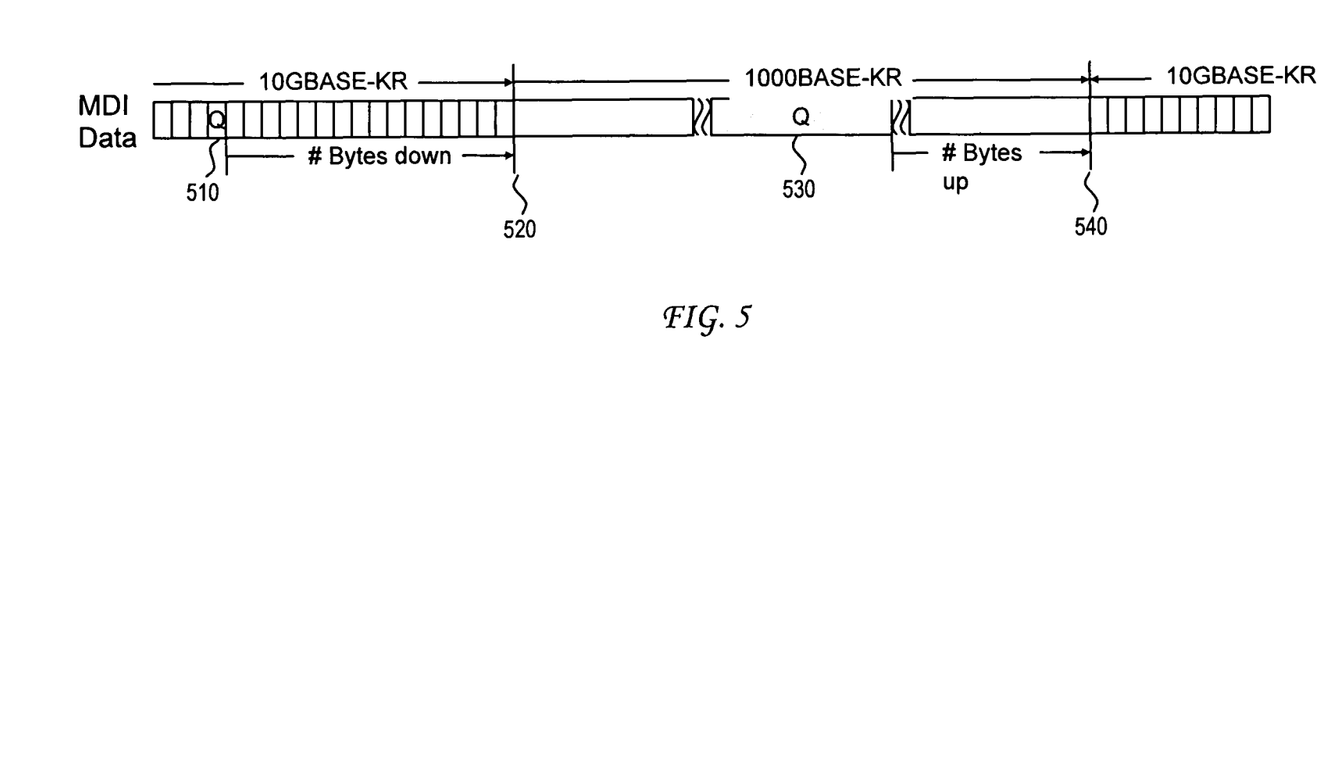
FIG. 5 illustrates an example of signaling using sequence ordered sets.

To illustrate the use of ||Q|| ordered sets, reference is now made to the example illustration of FIG. 5. In this example illustration, a link is initially operating at a 10 G link rate such as 10 GBASE-KR. In the midst of the data stream, the transmitting PHY can include sequence ordered set $||Q_{dn}||$ 510. Here, ||Q|| can specify the number of bytes after the receipt of $||Q_{dn}||$ at which a lower link rate would commence. This point is illustrated as time 520, whereupon the transmitting PHY would transition to a lower 1 G link rate. In the example of FIG. 5, this lower link rate is represented by 1000 BASE-KR, which is a subset of 10 GBASE-KR. As link utilization is often a relatively small percentage, the link can remain in the lower link rate until a burst of data is received. At that point, the transmitting PHY can include sequence ordered set $||Q_{up}||$ 530. Here, $||Q_{up}||$ can specify the number of bytes after the receipt of $||Q_{up}||$ at which a higher link rate would commence. This point is illustrated as time 540, whereupon the transmitting PHY would transition back to the higher 10 G link rate.

Figure 6:
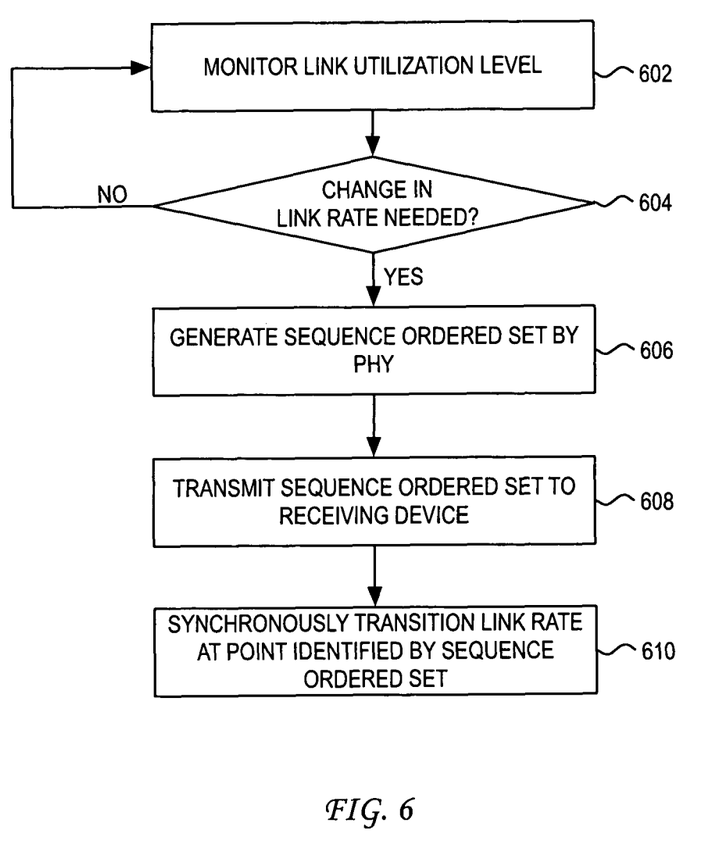
FIG. 6 illustrates a flowchart of a process of the present invention.

To further illustrate the use of ||Q|| ordered sets, reference is now made to the flowchart of FIG. 6. As illustrated, the process begins at step 602 where a link utilization level is monitored. This link utilization level can enable the system to determine whether or not the current link rate is properly matched with the amount of traffic to be transmitted. For example, if the link is idle, then a transition to a lower link rate can be considered. Alternatively, if the link is at or near capacity, then a transition to a higher link rate can be considered. At step 604, it is therefore determined whether a change in link rate is needed.

If it is determined that a change in link rate is not needed, then the process continues back to step 602 where the link utilization levels continue to be monitored. If, on the other hand, it is determined that a change in link rate is needed, then the process continues to step 606 where a sequence ordered set is generated by the PHY. The generated sequence ordered set is then transmitted to a receiving device at step 608. As noted, in one embodiment, the sequence ordered set is a ||Q|| ordered set that specifies the number of bytes "n" after the receipt of the ||Q|| ordered set at which a link rate change would commence. As would be appreciated, this link rate change can be up or down.

After the sequence ordered set is transmitted to the receiving device, a synchronous transition of the link rate occurs at step 610. In this process, the link rate transition is performed at a point in time identified by the transmitted sequence ordered set. Due to the synchronous nature of the transition, a seamless transition is effected between parent/subset PHYs.

As this process illustrates, ||Q|| ordered sets provide an efficient mechanism for communicating link rate transition control information at the physical layer. The time it takes to transition to a new link rate is thereby reduced. This is especially helpful in accommodating the transmission of a burst of data.

More generally, the efficient communication mechanism provided by ||Q|| ordered sets can be used to exchange energy efficient Ethernet related information beyond that used for transition times of a PHY. For example, ||Q|| ordered sets can be used to exchange information regarding a queue on the other side of the link, work load on the other side of the link, sleep time on the other side of the link, etc. Due to the speed at which the communication can occur, an efficient end-to-end control policy can be enabled between both ends of the link.

As noted, the ||Q|| ordered sets can be sent within the data stream instead of at the IPGs. Switching within the data stream can be enabled using synchronous technologies such as that described above. More generally, the use of ||Q|| ordered sets in communicating rate transitions can be used in applications beyond energy efficient Ethernet.

It should also be noted that ||Q|| ordered sets need not be used in a symmetric fashion. For example, the transition up need not have the same protocol as the transition down. One of the transitions could use a different technique. Specifically, a ||Q|| ordered set can be used in only one transition direction, while an out of bandwidth channel can be used for the other transition direction.

Figure 7:
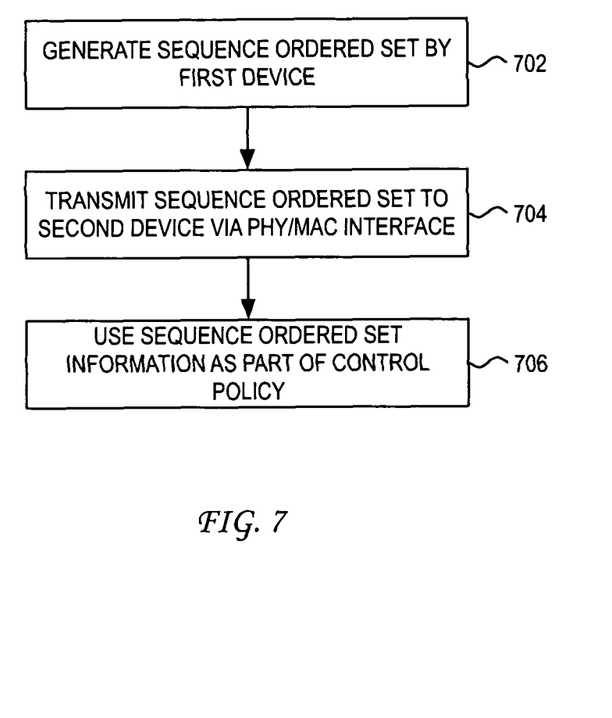
FIG. 7 illustrates a flowchart of a process of using sequence ordered sets over a PHY/MAC interface.

Additionally, it should be noted that the use of ||Q|| ordered sets for energy efficient Ethernet parameter communication need not be limited to communication between PHYs. ||Q|| ordered sets can also be used in communicating energy efficient Ethernet parameters between the PHY and the MAC. FIG. 7 illustrates an example of such a process. Here, a first device generates a sequence ordered set at step 702, which sequence ordered set carries energy efficient Ethernet parameters. At step 704, the generated sequence ordered set is then transmitted to a second receiving device via a PHY/MAC interface. For XGMII, for example, ||Q|| ordered sets map directly to the XGMII Sequence control character on lane 0 followed by three data characters in XGMII lanes 1 through 3. Finally, at step 706, the information contained in the sequence ordered set is used as part of a control policy. As such, ||Q|| ordered sets carrying energy efficient Ethernet parameters over the PHY/MAC interface can be used to control the energy efficient operation of the PHY/MAC interface or be used as part of a broader control policy in the layers above the PHY.

As noted above, while the description above was provided in the context of IEEE 802.3ap, this example should not be construed as limiting. The principles of the present invention can be applied, for example, to various PHY technologies such as backplane, twisted pair and optical. Further, the principles of the present invention can be applied to future speeds such as 40 G and 100 G, as well as other non-standard speeds (e.g., 5 G, 2.5 G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for controlling a transition in link rate of an Ethernet physical layer device, comprising:
   detecting a need for a change in link rate;
   generating a sequence ordered set by the Ethernet physical layer device, said sequence ordered set including transition time information, said transition time information enabling an identification of a duration of time following a receipt of said sequence ordered set at which a link rate transition will occur; and
   transmitting said generated sequence ordered set on the link.

2. The method of claim 1, wherein said transmitting comprises transmitting said sequence ordered set in an interpacket gap.

3. The method of claim 1, wherein said transmitting comprises transmitting said sequence ordered set in the data stream.

4. The method of claim 1, wherein said sequence ordered set identifies a synchronous change in link rate.

5. The method of claim 1, wherein said sequence ordered set consists of a control character and three data characters.

6. The method of claim 1, wherein said change is a link rate increase.

7. The method of claim 1, wherein said change is a link rate decrease.

8. The method of claim 1, wherein the Ethernet physical layer device is a backplane physical layer device.

9. The method of claim 1, wherein the Ethernet physical layer device is a twisted pair physical layer device.

10. The method of claim 1, wherein the Ethernet physical layer device is an optical physical layer device.

11. A method for controlling a reduction in link rate of an Ethernet physical layer device, comprising:
    detecting a need for a change in link rate of a parent physical layer device;
    signaling a time of a synchronous change in said link rate using a physical layer control mechanism, said physical layer control mechanism being based on a sequence ordered set that includes transition time information, said transition time information enabling an identification of a duration of time following a receipt of said sequence ordered set at which a link rate transition will occur; and
    reducing a clock rate of core logic of a parent physical layer device to produce a subset of said parent physical layer device at said signaled time, wherein said subset physical layer device has a reduced link rate relative to said parent physical layer device.

12. The method of claim 11, wherein said reducing comprises dividing said clock rate.

13. A physical layer device that enables synchronous transitions between link rates, comprising:
    a physical coding sublayer that includes an encoder and decoder that encodes and decodes data to and from code groups for communication with a physical medium attachment, wherein said encoder and decoder operates at a first clock rate when the physical layer device operates at a first link rate and at a second clock rate when the physical layer device operates at a second link rate lower than said first link rate; and
    a control module that generates a sequence ordered set including transition time information for a receiving device, said transition time information enabling an identification of a duration of time following a receipt of said sequence ordered set at which the physical layer device will transition from said first link rate to said second link rate.

14. The physical layer device of claim 13, wherein said first link rate is 10 gigabit/second and said second link rate is 1 gigabit/second.

15. The physical layer device of claim 13, wherein said encoder and decoder is a 64B/66B encoder and decoder.

16. The method of claim 1, wherein said sequence ordered set specifies a number of bytes after receipt of said sequence ordered set at which a link rate transition will occur.

17. The method of claim 11, wherein said physical layer control mechanism is based on a sequence ordered set that specifies a number of bytes after receipt of said sequence ordered set at which a link rate transition will occur.

18. The physical layer device of claim 13, wherein said sequence ordered set identifies a number of bytes after which said transition will occur.

* * * * *